(12) United States Patent
Kang et al.

(10) Patent No.: US 10,789,714 B2
(45) Date of Patent: Sep. 29, 2020

(54) APPARATUS AND METHOD FOR DETECTING REFLECTION

(71) Applicant: SAMSUNG ELECTRONICS CO., LTD., Suwon-si (KR)

(72) Inventors: Dongwoo Kang, Seoul (KR); Dong Kyung Nam, Yongin-si (KR); Jingu Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 16/032,447

(22) Filed: Jul. 11, 2018

(65) Prior Publication Data

US 2019/0197690 A1 Jun. 27, 2019

(30) Foreign Application Priority Data

Dec. 21, 2017 (KR) .................... 10-2017-0177131

(51) Int. Cl.
| | |
|---|---|
| *G06T 7/11* | (2017.01) |
| *G06K 9/20* | (2006.01) |
| *G06K 9/00* | (2006.01) |
| *G06F 3/01* | (2006.01) |
| *G06T 5/50* | (2006.01) |
| *G06K 9/32* | (2006.01) |

(52) U.S. Cl.
CPC ............. *G06T 7/11* (2017.01); *G06F 3/013* (2013.01); *G06K 9/0061* (2013.01); *G06K 9/2018* (2013.01); *G06K 9/2027* (2013.01); *G06T 5/50* (2013.01); *G06K 9/00832* (2013.01); *G06K 2009/3291* (2013.01); *G06T 2207/10048* (2013.01)

(58) Field of Classification Search
CPC . G06T 2207/10016; G06T 2207/30196; G06T 2207/10048; G06T 2207/10024
See application file for complete search history.

(56) References Cited

U.S. PATENT DOCUMENTS

| | | | | |
|---|---|---|---|---|
| 6,091,899 A | * | 7/2000 | Konishi | G03B 13/02 396/51 |
| 7,076,088 B2 | * | 7/2006 | Pavlidis | G06K 9/00228 348/164 |
| 7,176,973 B2 | * | 2/2007 | Takada | G06K 9/00604 348/335 |

(Continued)

FOREIGN PATENT DOCUMENTS

| | | |
|---|---|---|
| KR | 10-1064971 B1 | 9/2011 |
| KR | 10-2016-0028244 A | 3/2016 |
| WO | 2016/131075 A1 | 8/2016 |

OTHER PUBLICATIONS

Communication dated Apr. 3, 2019, issued by the European Patent Office in counterpart European Application No. 18202758.1.

(Continued)

*Primary Examiner* — Yosef Kassa
(74) *Attorney, Agent, or Firm* — Sughrue Mion, PLLC

(57) ABSTRACT

A method and apparatus for detecting a reflection are provided. The method includes acquiring an input image of an object, based on an activation of an infrared light source, acquiring a reference image of the object, based on a deactivation of the infrared light source, and extracting a reflection region from the input image, based on the input image and the reference image.

20 Claims, 19 Drawing Sheets

(56) References Cited

U.S. PATENT DOCUMENTS

| | | | | |
|---|---|---|---|---|
| 7,289,736 B1 * | 10/2007 | Graves | ............... | G02B 26/06 398/119 |
| 7,306,337 B2 * | 12/2007 | Ji | ............... | G06F 3/013 351/209 |
| 7,438,414 B2 * | 10/2008 | Rosenberg | ............... | G06F 3/013 351/209 |
| 7,538,744 B1 * | 5/2009 | Liu | ............... | G06F 3/013 345/7 |
| 8,352,901 B2 * | 1/2013 | Benjamin | ............... | G06F 30/367 716/138 |
| 8,477,425 B2 * | 7/2013 | Border | ............... | G02B 27/017 359/630 |
| 8,482,859 B2 * | 7/2013 | Border | ............... | G02B 27/017 353/28 |
| 8,767,082 B2 * | 7/2014 | Thorn | ............... | G02B 7/287 348/222.1 |
| 9,330,302 B2 | 5/2016 | Thukral et al. | | |
| 9,430,040 B2 * | 8/2016 | Zhang | ............... | G06K 9/0061 |
| 9,454,699 B2 | 9/2016 | Agrawal et al. | | |
| 9,468,373 B2 | 10/2016 | Larsen | | |
| 2011/0170060 A1 | 7/2011 | Gordon | | |
| 2013/0321265 A1 | 12/2013 | Bychkov et al. | | |
| 2015/0199006 A1 | 7/2015 | He et al. | | |
| 2015/0346815 A1 | 12/2015 | Horesh | | |
| 2016/0134863 A1 | 5/2016 | Horesh | | |
| 2016/0334869 A1 | 11/2016 | Zhang et al. | | |
| 2017/0027441 A1 | 2/2017 | Larsen | | |

OTHER PUBLICATIONS

Haro, A., et al., "Detecting and Tracking Eyes by Using Their Physiological Properties, Dynamics, and Appearance", Jun. 13, 2000, Proceedings 2000 IEEE Conference on Computer Vision and Pattern Recognition, XP001035597, pp. 163-168, 6 pages total.

Tokunou, K., et al., "Automated Thresholding for Real-Time Image Processing in Video-Based Eye-Gaze Detection", Oct. 29, 1998, Proceedings of the 20th Annual Intemadonal Conference of the IEEE Engineering in Medicine and Biology Society, vol. 20, No. 2, pp. 748-751, 4 pages total.

Ebisawa, Yoshinobu, "Improved Video-Based Eye-Gaze Detection Method", Aug. 1998, IEEE Transactions on Instrumentation and Measurement, vol. 47, No. 4, p. 948-955, 8 pages total.

* cited by examiner

APPARATUS AND METHOD FOR DETECTING REFLECTION

CROSS-REFERENCE TO RELATED APPLICATION

This application claims priority from Korean Patent Application No. 10-2017-0177131, filed on Dec. 21, 2017, in the Korean Intellectual Property Office, the disclosure of which is incorporated herein by reference in its entirety.

BACKGROUND

1. Field

Methods and apparatuses consistent with example embodiments relate to detecting a reflection.

2. Description of the Related Art

Camera-based eye tracking technologies may be utilized in many fields, for example, a viewpoint tracking-based super multi-view autostereoscopic three-dimensional (3D) display. A camera-based eye tracker may operate normally in a high illumination environment (for example, 400 Lux), but may not operate normally in a low illumination environment due to a low quality of a camera image. In a dark place as well as a bright place, a user may frequently watch a television (TV) or use a mobile device. Also, driving at night-time needs to be considered in a technology of a next-generation 3D head-up display (HUD) for vehicles.

For example, when user's eyes are tracked using a color camera in a low illumination environment, for example, a dark place or nighttime, a success rate and an accuracy of eye tracking may decrease due to a reduction in an image quality, and accordingly an infrared camera may be used. However, when the infrared camera is used, a success rate and an accuracy of eye tracking of a person wearing glasses may be reduced due to a reflection on lenses of the glasses.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a method of detecting a reflection, the method being performed by an apparatus for detecting the reflection, and the method including acquiring an input image of an object, based on an activation of an infrared light source, acquiring a reference image of the object, based on a deactivation of the infrared light source, and extracting a reflection region from the input image, based on the input image and the reference image.

The acquiring of the input image may include activating the infrared light source during an on interval, and the acquiring of the reference image may include deactivating the infrared light source during an off interval.

The acquiring of the input image may further include generating the input image, based on a first plurality of rays that is received from the object, during the on interval, and the acquiring of the reference image may further include generating the reference image, based on a second plurality of rays that is received from the object, during the off interval.

The generating of the input image may include collecting first intensities of the first plurality of rays received from the object, during a first portion of first frames in the on interval, and determining the first intensities as first pixel values of first pixels of the input image, to generate the input image. The generating of the reference image may include collecting second intensities of the second plurality of rays received from the object, during a second portion of second frames in the off interval, and determining second intensities as second pixel values of second pixels of the reference image, to generate the reference image.

The extracting of the reflection region may include generating a difference map by subtracting first pixel values of the reference image from second pixel values of the input image respectively corresponding to the first pixel values, the difference map indicating a difference between the input image and the reference image, and extracting the reflection region from the input image, based on the difference map.

The extracting of the reflection region may further include determining elements of the difference map, the elements having difference values exceeding a threshold, and determining, as the reflection region, pixels of the input image that correspond to the elements.

The method may further include tracking a position of the object, and designating at least one of a plurality of infrared light sources included in an infrared ray array, the at least one of the plurality of infrared light sources corresponding to the position that is tracked. The acquiring of the input image may include activating the at least one of the plurality of infrared light sources that is designated, during an on interval, and the acquiring of the reference image may include deactivating the at least one of the plurality of infrared light sources that is designated, during an off interval.

The acquiring of the input image may include acquiring the input image, based on an infrared region of a first ray that is received from the object during an on interval in which the infrared light source is activated, and the acquiring of the reference image may include acquiring the reference image, based on a visible ray region of a second ray that is received from the object during an off interval in which the infrared light source is deactivated.

The method may further include dynamically adjusting a first length of an on interval in which the infrared light source is activated and a second length of an off interval in which the infrared light source is deactivated.

The method may further include removing the reflection region from the input image, and tracking a gaze of a user, based on the input image from which the reflection region is removed.

The infrared light source and an image acquirer may be arranged so that a predetermined angle is formed by a first direction in which the infrared light source emits a first ray to the object and by a second direction in which the image acquirer receives a second ray from the object.

The method may further include gradually increasing a ray intensity of the infrared light source from a first start timing to a first intermediate timing in an on interval in which the infrared light source is activated, gradually decreasing the ray intensity from the first intermediate timing to a first end timing in the on interval, gradually decreasing the ray intensity from a second start timing to a second intermediate timing in an off interval in which the infrared light source is deactivated, and gradually increasing the ray intensity from the second intermediate timing to a second end timing in the off interval.

The method may further include periodically deactivating the infrared light source, in response to a detection of a transparent object that causes a light reflection between a user and the apparatus.

The acquiring of the input image may include increasing an intensity of the infrared light source from an off level to an on level, during an on interval; and the acquiring of the reference image may include decreasing the intensity of the infrared light source from the on level to the off level, during an off interval.

A non-transitory computer-readable storage medium may store instructions that, when executed by a processor, cause the processor to perform the method.

According to an aspect of an example embodiment, there is provided an apparatus for detecting a reflection, the apparatus including an image acquirer configured to acquire an input image of an object, based on an activation of an infrared light source, and acquire a reference image of the object, based on a deactivation of the infrared light source, and a processor configured to extract a reflection region from the input image, based on the input image and the reference image.

The apparatus may further include an infrared ray array including a plurality of infrared light sources, the infrared ray array being spaced apart from the image acquirer. The processor may be further configured to activate at least one of the plurality of infrared light sources during an on interval, and deactivate the at least one of the plurality of infrared light sources during an off interval.

The processor may be further configured to generate a difference map by subtracting first pixel values of the reference image from second pixel values of the input image respectively corresponding to the first pixel values, the difference map indicating a difference between the input image and the reference image, and extract the reflection region from the input image, based on the difference map.

The image acquirer may be further configured to receive, from the object, a first ray during an on interval in which the infrared light source is activated and a second ray during an off interval in which the infrared light source is deactivated. The processor may be further configured to acquire the input image, based on an infrared region of the first ray, and acquire the reference image, based on a visible ray region of the second ray.

The apparatus may further include an infrared ray array spaced apart from the image acquirer so that a predetermined angle is formed by a first direction in which the infrared ray array emits a first ray to the object and a second direction in which the image acquirer receives a second ray from the object. The processor may be further configured to activate at least one of a plurality of infrared light sources included in the infrared ray array, so that the predetermined angle is maintained at a position of the object, in response to a movement of the object being detected.

According to an aspect of an example embodiment, there is provided a method of detecting a reflection, the method being performed by an apparatus for detecting the reflection, and the method including acquiring an input image of an object, based on an activation of an infrared light source, acquiring a reference image of the object, based on a deactivation of the infrared light source, and generating a difference map by subtracting first pixel values of the reference image from second pixel values of the input image respectively corresponding to the first pixel values. The method further includes determining elements of the difference map, the elements having difference values exceeding a threshold, and removing a reflection region from the input image, the reflection region corresponding to the elements.

The method may further include adjusting a first length of an on interval in which the infrared light source is activated to be shorter than a second length of an off interval in which the infrared light source is deactivated.

BRIEF DESCRIPTION OF THE DRAWINGS

The above and/or other aspects will be more apparent by describing example embodiments with reference to the accompanying drawings, in which.

DETAILED DESCRIPTION

Figure 1:
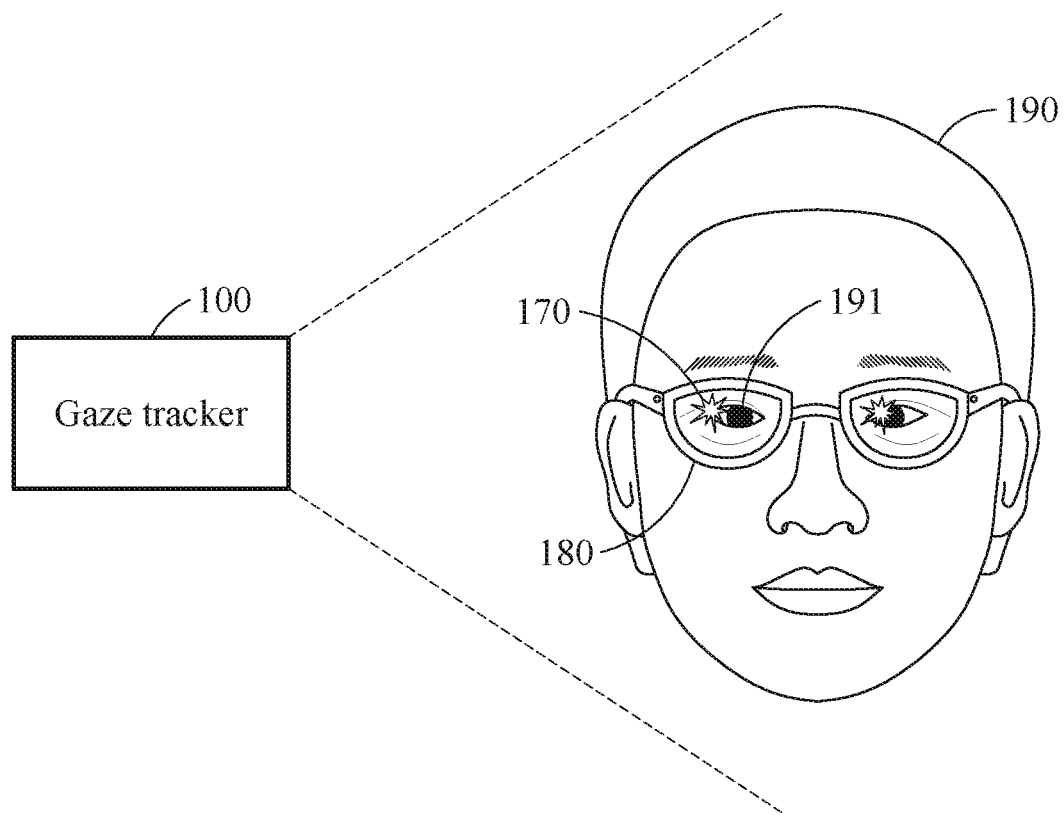
FIG. 1 is a diagram illustrating an example in which a gaze tracker tracks a user's gaze according to an example embodiment.

Reference will now be made in detail to example embodiments, examples of which are illustrated in the accompanying drawings, wherein like reference numerals refer to the like elements throughout.

Various modifications may be made to the following example embodiments. Here, the example embodiments are not construed as limited to the disclosure and may be understood to include all changes, equivalents, and replacements within the idea and the technical scope of the disclosure.

The terminology used herein is for the purpose of describing the example embodiments only and is not to be limiting of the examples. As used herein, the singular forms are intended to include the plural forms as well, unless the context clearly indicates otherwise. It may be further understood that the terms "include/comprise" and/or "have" when used in this specification, specify the presence of stated features, integers, steps, operations, elements, components and/or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the example embodiments belong. It will be further understood that terms, such as those defined in commonly-used dictionaries, may be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. When it is determined detailed description related to a related known function or configuration they may make the purpose of the example embodiments unnecessarily ambiguous in describing the example embodiments, the detailed description will be omitted here.

FIG. 1 is a diagram illustrating an example in which a gaze tracker tracks a user's gaze according to an example embodiment.

Referring to FIG. 1, a gaze tracker 100 may track a gaze of a user 190. The gaze tracker 100 may detect a position of a pupil 191 of the user 190 and may track a movement of the pupil 191. For example, the gaze tracker 100 may extract a face region including a face of the user 190, and may extract an eye region from the face region. The gaze tracker 100 may detect the pupil 191 in the eye region. However, the example embodiment is not limited thereto.

The gaze tracker 100 may track the gaze of the user 190 using infrared rays. Using infrared rays, the gaze tracker 100 may accurately track the gaze of the user 190 even in a relatively low illumination environment. However, when a transparent object 180 that may cause a light reflection is located between the gaze tracker 100 and the user 190, a reflection phenomenon 170 may appear on an image captured by the gaze tracker 100. For example, the user 190 may wear the transparent object 180, and a reflection phenomenon due to the transparent object 180 may hinder a detection of a gaze. The transparent object 180 may include, for example, glasses or sunglasses.

In example embodiments, a reflection may refer to a phenomenon in which a ray emitted from a light source is reflected from an arbitrary object (for example, a transparent object, such as glasses) and is incident on an image acquirer (for example, a camera) at an intensity that is close to or greater than a maximum intensity that may be sensed. The image acquirer may determine, as a saturated value, a value of a pixel corresponding to a reflection region in which the reflection occurs. The saturated value may be, for example, a value corresponding to a maximum intensity that may be sensed by the image acquirer.

Figure 2:
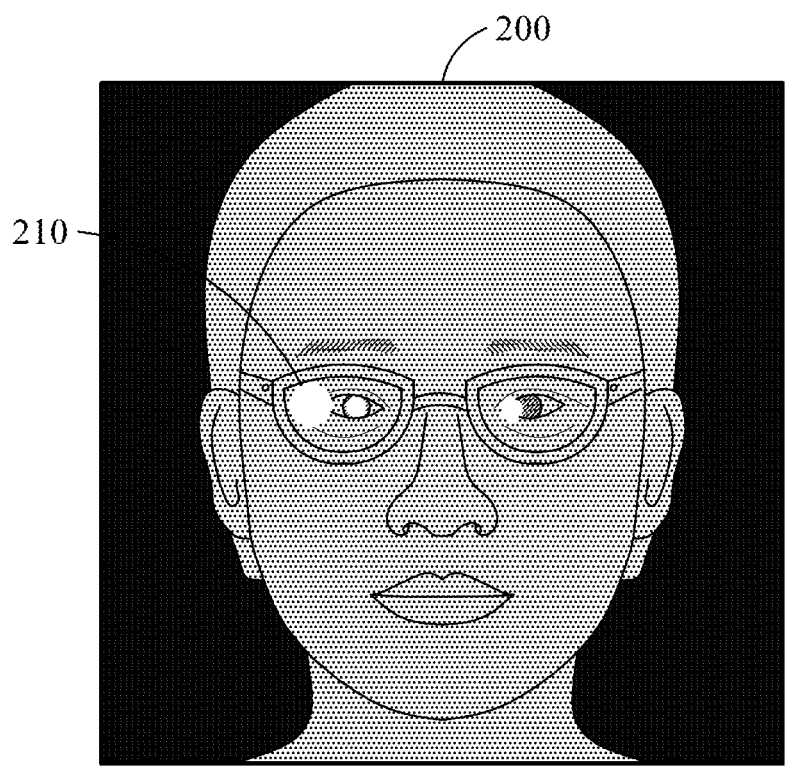
FIG. 2 is an image captured by a gaze tracker before a reflection region is removed.

FIG. 2 is an image captured by a gaze tracker before a reflection region is removed.

An object image 200 of FIG. 2 may be an image captured by a gaze tracker. The object image 200 may be an image including an object, and an object may include, for example, at least a part of a human body. The object image 200 may be an image acquired by capturing a face of a person.

As shown in FIG. 2, a reflection region 210 may appear on a transparent object (for example, glasses) that may cause a light reflection. The reflection region 210 may have a higher intensity than those of neighboring regions, and may have, for example, a maximum intensity that may be sensed by a sensor. A pupil is brightly detected in comparison to an iris from a user's face, and accordingly an accuracy of a pupil detection may decrease when the reflection region 210 appears closer to an eye.

Figure 3:
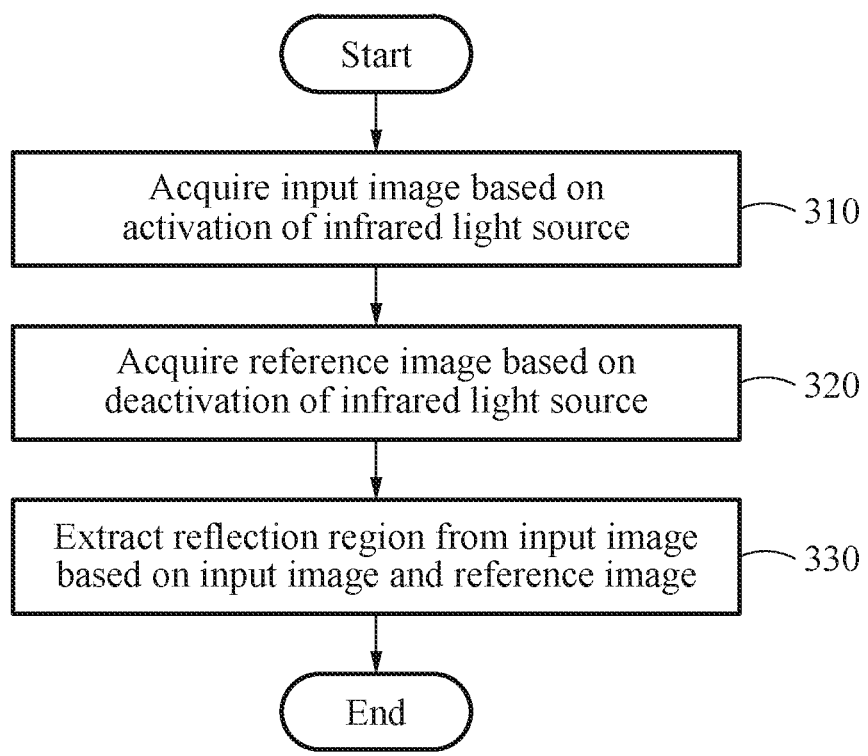
FIGS. 3 and 4 are flowcharts illustrating a method of detecting a reflection according to an example embodiment.
Figure 4:
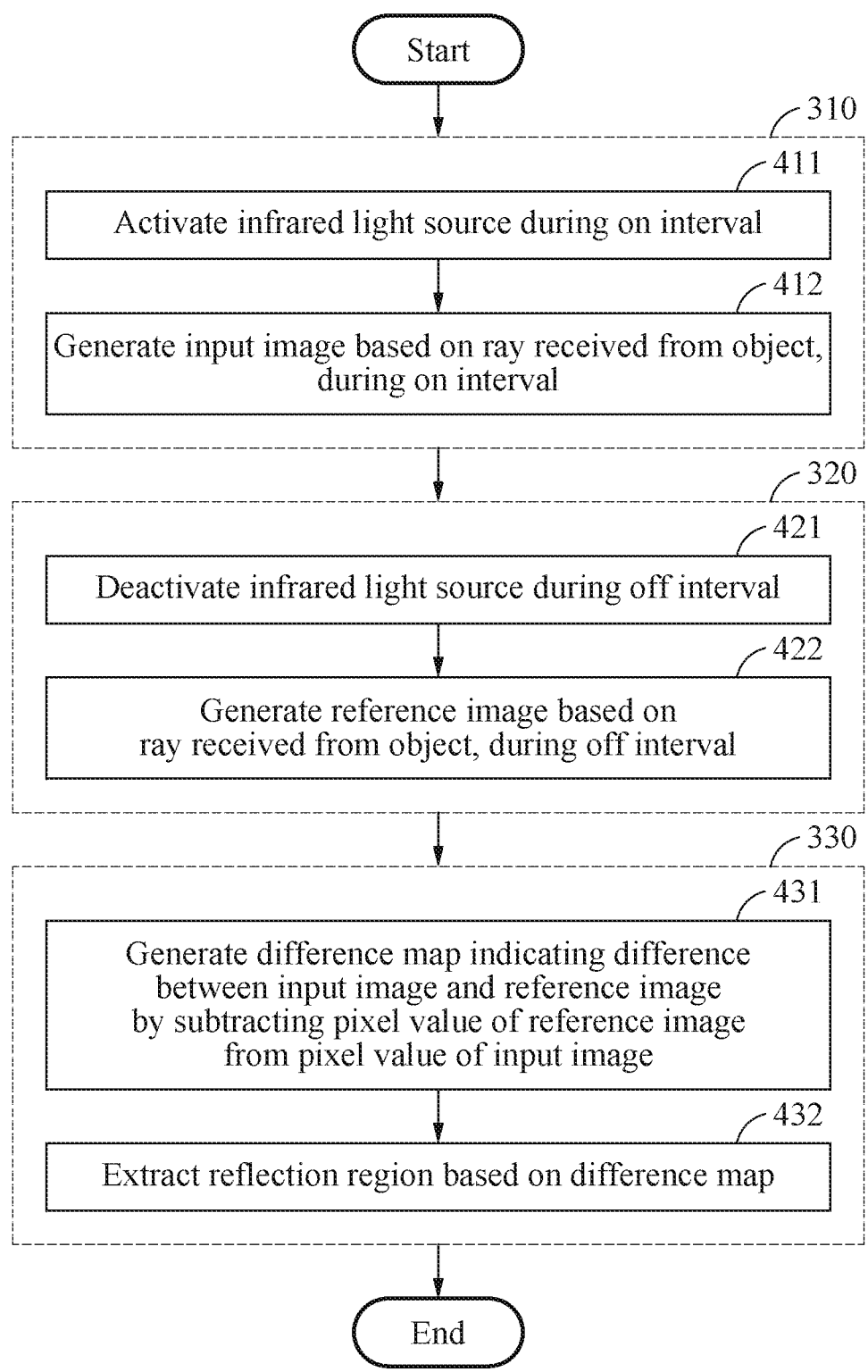

FIGS. 3 and 4 are flowcharts illustrating a method of detecting a reflection according to an example embodiment.

Referring to FIG. 3, in operation 310, an apparatus for detecting a reflection (hereinafter, referred to as a reflection detection apparatus) may acquire an input image based on an activation of an infrared light source. The infrared light source may be a light source configured to emit infrared rays, and may include, for example, an infrared light-emitting diode (LED). The infrared light source may emit a bunch of infrared rays. The reflection detection apparatus may include an infrared ray array including a plurality of infrared light sources. The input image may be an image acquired by capturing an object, and may be used to track a gaze of a user that is an object. For example, the input image may be generated based on an infrared region and a visible ray region.

An activation of an infrared ray may refer to an operation of adjusting an intensity of a ray emitted from the infrared light source to an on level. An intensity corresponding to the on level may vary depending on a design. For example, the reflection detection apparatus may control the infrared light source to emit a ray with an intensity greater than or equal to a threshold intensity, to activate the infrared light source.

A ray intensity corresponding to the on level may be designed as an intensity that is sufficient to allow a processor to extract a feature point of an object form the input image. For example, an infrared ray emitted with an intensity corresponding to an on level may be protected to an object. In this example, an image acquirer may receive an infrared ray that is reflected from the object in response to a projection of the infrared ray to the object. Also, the image acquirer may generate an input image based on the received infrared ray, and the processor may extract a feature point of the object from the input image. In response to an increase in the ray intensity corresponding to the on level, the image acquirer may acquire a sharper input image, and the processor may more accurately extract a feature point of the object.

A feature point of the object may be a point indicating a feature of the object in an image. For example, when the object is a face of a person, a feature point of the face may be a point corresponding to an eye, a point corresponding to a nose, a point corresponding to a mouth, and a point corresponding to an ear. However, the feature point of the object is not limited thereto.

In operation 320, the reflection detection apparatus may acquire a reference image based on a deactivation of the infrared light source. The reference image may be an image acquired by capturing an object, and may be used to detect a reflection. The reference image may be generated mainly based on, for example, a visible ray region.

The deactivation of the infrared light source may refer to an operation of adjusting an intensity of a ray emitted from the infrared light source to an off level. An intensity corresponding to the off level may vary depending on a design. For example, the reflection detection apparatus may control the infrared light source to emit a ray with an intensity less than a threshold intensity, to deactivate the infrared light source. Also, the reflection detection apparatus may cut off a power supply to the infrared light source, to deactivate the infrared light source. When the power supply is cut off, a ray intensity of the infrared light source may be zero or may converge to zero.

A ray intensity corresponding to the off level may be designed as an intensity that is sufficient to allow the processor to extract a reflection region form the input image. For example, the deactivated infrared light source may interrupt emitting of an infrared ray. Also, an infrared ray emitted with an intensity corresponding to an off level may be projected to an object, and may be mostly absorbed to the object or attenuated. In response to a decrease in the ray intensity corresponding to the off level, the image acquirer may acquire a reference image that may not include a reflection region or that may include a relatively small reflection region.

In operation 330, the reflection detection apparatus may extract a reflection region from the input image based on the input image and the reference image. For example, the reflection detection apparatus may calculate a difference between the input image and the reference image, and may generate a difference map. A region with a great difference between the input image and the reference image may indicate a reflection region generated by an infrared ray with an intensity corresponding to an on level, because the input image is generated mainly based on an infrared region and the reference image is generated mainly based on a visible ray region.

The difference map may indicate the difference between the input image and the reference image. For example, the difference map may include a plurality of elements. Each of the plurality of elements may have a value corresponding to a difference between a pixel of an input image corresponding to a corresponding element and a pixel of the reference image. A number of the plurality of elements may be equal to, for example, a number of pixels in the input image or a number of pixels in the reference image.

The reflection detection apparatus may periodically deactivate the infrared light source during a detection of a transparent object that may cause a light reflection between a user and the reflection detection apparatus. For example, while a user wears glasses, the reflection detection apparatus may repeat the activation and deactivation of the infrared light source, to enhance an accuracy of a pupil detection.

FIG. 4 illustrates an example of the method of FIG. 3.

Referring to FIG. 4, in operation 411, the reflection detection apparatus may activate the infrared light source during an on interval. In example embodiments, the on interval may refer to an interval designated to activate the infrared light source, within a predetermined period. The on interval will be further described below with reference to FIGS. 9, 10 and 11.

In operation 412, the reflection detection apparatus may generate the input image based on a ray received from the object, during the on interval. For example, the reflection detection apparatus may collect intensities of a plurality of rays from the object during at least a portion of frames in the on interval. For example, when the on interval includes a plurality of frames, the reflection detection apparatus may collect intensities of a plurality of rays during a last frame in the on interval. The reflection detection apparatus may determine an intensity corresponding to each of the plurality of rays as a pixel value of each of pixels included in the input image, and may generate the input image. Also, the reflection detection apparatus may accumulate intensities collected during a portion of frames in the on interval, and may generate the input image.

For example, the reflection detection apparatus may acquire the input image based on an infrared region of a ray received from the object during the on interval. The ray received during the on interval may include rays corresponding to an infrared region and a visible ray region. Thus, each of the pixels in the input image may have a value obtained by adding a ray intensity of the infrared region and a ray intensity of the visible ray region.

In example embodiments, the infrared region may indicate a frequency band that is classified as an infrared ray among frequencies of electromagnetic waves. Also, the visible ray region may indicate a frequency band visible to human eyes in electromagnetic waves.

In operation 421, the reflection detection apparatus may deactivate the infrared light source during the off interval. In example embodiments, the off interval may refer to an interval designated to deactivate the infrared light source, within a predetermined period. For example, the off interval may be an interval other than the on interval in the predetermined period. The off interval will be further described below with reference to FIGS. 9 through 11.

In operation 422, the reflection detection apparatus may generate a reference image based on the ray received from the object, during the off interval. For example, the reflection detection apparatus may collect intensities of a plurality of rays from the object during at least a portion of frames in the off interval. For example, when the off interval includes a plurality of frames, the reflection detection apparatus may collect intensities of a plurality of rays during a last frame in the off interval. The reflection detection apparatus may determine an intensity corresponding to each of the plurality of rays as a pixel value of each of pixels included in the reference image, and may generate the reference image. Also, the reflection detection apparatus may accumulate intensities collected during a portion of frames in the off interval, and may generate the reference image.

The reflection detection apparatus may acquire the reference image based on a visible ray region of a ray received from the object during the off interval. For example, the ray received during the off interval may dominantly include rays corresponding to a visible ray region. Thus, each of the pixels in the reference image may have a value corresponding to a ray intensity of the visible ray region.

In operation 431, the reflection detection apparatus may generate a difference map indicating a difference between the input image and the reference image, by subtracting a pixel value of the reference image corresponding to a pixel value of the input image from the pixel value of the input image. The difference map may include the same number of elements as a number of pixels in the input image and a number of pixels in the reference image. Each of the elements of the difference map may have a value corresponding to a difference between a pixel value of the input image and a pixel value of the reference image.

In operation 432, the reflection detection apparatus may extract a reflection region based on the difference map. The reflection detection apparatus may determine elements that have values exceeding a threshold in the difference map. The reflection detection apparatus may determine pixels of the input image that correspond to elements to be the reflection region.

However, the example embodiment is not limited thereto, and the reflection detection apparatus may select an element having a value higher than a value of a neighboring element from the difference map. The reflection detection apparatus may determine a pixel of the input image that corresponds to the selected element to be the reflection region.

The reflection detection apparatus may remove the extracted reflection region from the input image. The reflection detection apparatus may track a gaze of a user based on the input image from which the reflection region is removed.

Thus, the reflection detection apparatus may more accurately determine a position of a user's pupil, based on an input image from which a reflection is removed.

Figure 5:
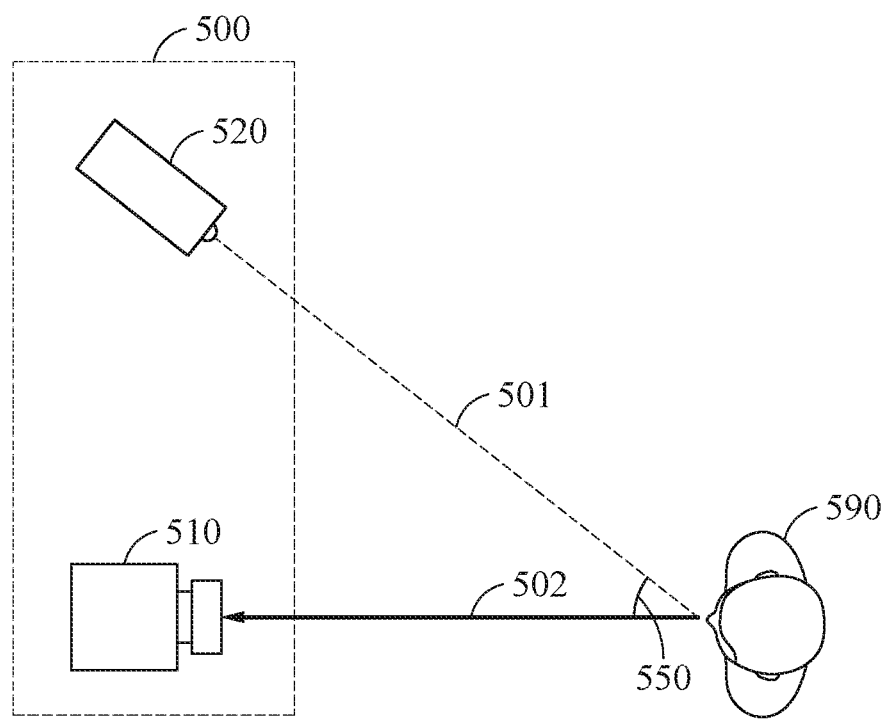
FIG. 5 is a diagram illustrating a structure in which an image acquirer and an infrared light source of a reflection detection apparatus are spaced apart according to an example embodiment.

FIG. 5 is a diagram illustrating a structure in which an image acquirer and an infrared light source of a reflection detection apparatus are spaced apart according to an example embodiment.

Referring to FIG. 5, a reflection detection apparatus 500 may include an image acquirer 510 and an infrared light source 520. The image acquirer 510 and the infrared light source 520 may be spaced apart from each other. The image acquirer 510 and the infrared light source 520 may be arranged so that a predetermined angle 550 may be formed by a direction of the image acquirer 510 and a direction of the infrared light source 520.

The direction of the infrared light source 520 may indicate a direction in which an infrared ray 501 is emitted from the infrared light source 520 and propagates. For example, when a bunch of infrared rays is emitted from the infrared light source 520, a propagation direction of the infrared ray 501 corresponding to a central ray among the infrared rays may be the direction of the infrared light source 520. The direction of the image acquirer 510 may indicate a direction corresponding to a central ray among rays that may be received by the image acquirer 510. The rays that may be received by the image acquirer 510 may be, for example, rays included in a field of view (FOV) of the image acquirer 510.

The image acquirer 510 may receive a ray 502 that corresponds to an infrared region and a visible ray region from an object 590. For example, the object 590 may reflect an infrared ray projected by the infrared light source 520 or reflect a visible ray projected by an external device.

FIGS. 6A, 6B, 6C, 6D, 6E and 6F are images acquired based on a degree to which an image acquirer and an infrared light source are spaced apart according to an example embodiment.

FIGS. 6A through 6F illustrate input images acquired by the image acquirer based on an arrangement of the image acquirer and the infrared light source.

Figure 6A:
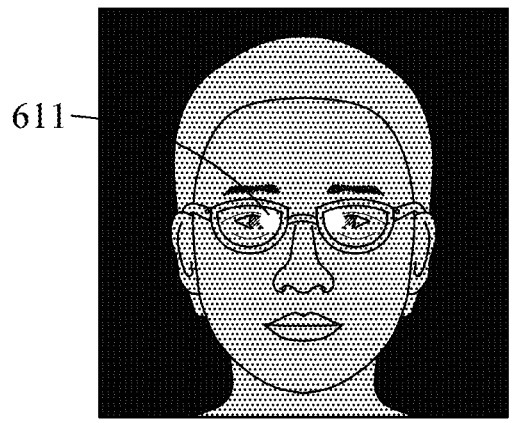
FIGS. 6A, 6B, 6C, 6D, 6E and 6F are images acquired based on a degree to which an image acquirer and an infrared light source are spaced apart according to an example embodiment.

FIG. 6A illustrates an example in which a direction difference between the image acquirer and the infrared light source is zero. For example, when a direction of the image acquirer and a direction of the infrared light source are identical to each other, a reflection region 611 may appear as shown in FIG. 6A. In FIG. 6A, the reflection region 611 may appear around an eye.

Figure 6B:
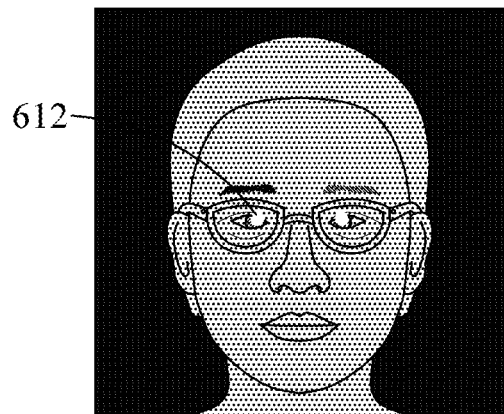

FIG. 6B illustrates an input image acquired in a structure in which an angle of 10 degrees is horizontally formed by the direction of the image acquirer and the direction of the infrared light source. In the input image of FIG. 6B, a reflection region 612 may appear to cover at least a portion of an eye.

Figure 6C:
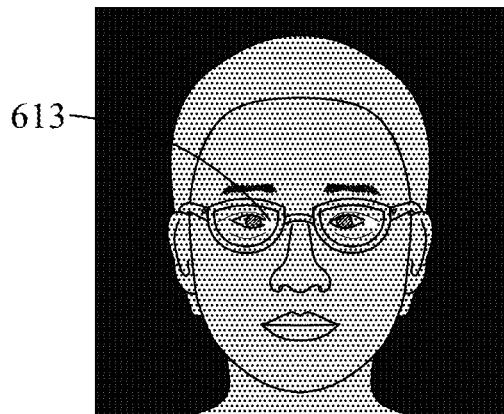

FIG. 6C illustrates an input image acquired in a structure in which an angle of 45 degrees is horizontally formed by the direction of the image acquirer and the direction of the infrared light source. In the input image of FIG. 6C, a reflection region 613 may be reduced in size in comparison to FIGS. 6A and 6B.

Figure 6D:
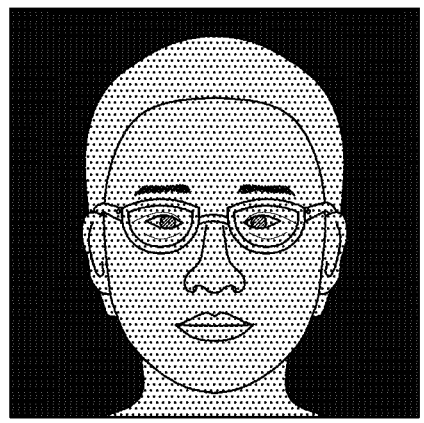

FIG. 6D illustrates an input image acquired in a structure in which an angle of 45 degrees is vertically formed by the direction of the image acquirer and the direction of the infrared light source. In FIG. 6D, a reflection region may not appear.

Figure 6E:
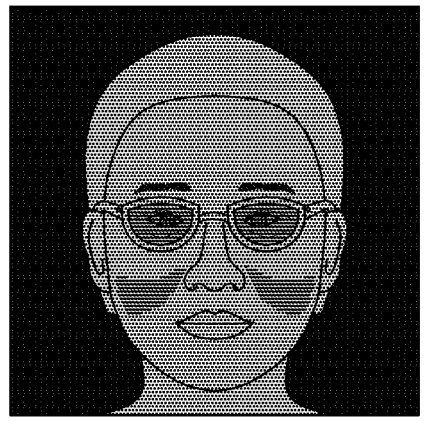

FIG. 6E illustrates an input image acquired in a structure in which an angle of 60 degrees is vertically formed by the direction of the image acquirer and the direction of the infrared light source. The input image of FIG. 6E may not include a reflection region, however, may include a shadow region that appears on an eye and a cheek. The shadow region may have a darker pixel value than a neighboring region.

Figure 6F:
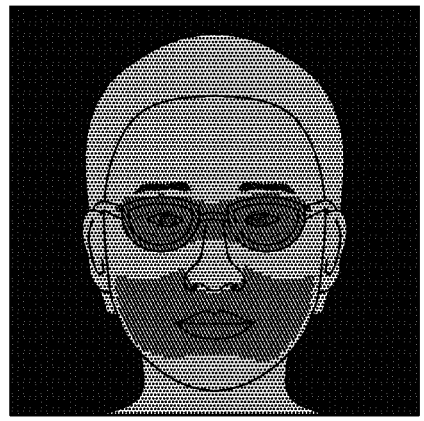

FIG. 6F illustrates an input image acquired in a structure in which an angle of 90 degrees is vertically formed by the direction of the image acquirer and the direction of the infrared light source. The input image of FIG. 6F may not include a reflection region, however, may include a shadow region that is wider than the shadow region of FIG. 6E.

Thus, the image acquirer and the infrared light source may be arranged so that an optimum angle may be formed by the direction of the image acquirer and the direction of the infrared light source. For example, a reflection detection apparatus that includes the image acquirer and the infrared light source arranged to optimize the direction difference may acquire an input image in which a reflection region and a shadow region are minimized. For example, an angle of 56 degrees may be formed by the direction of the image acquirer and the direction of the infrared light source.

Figure 7:
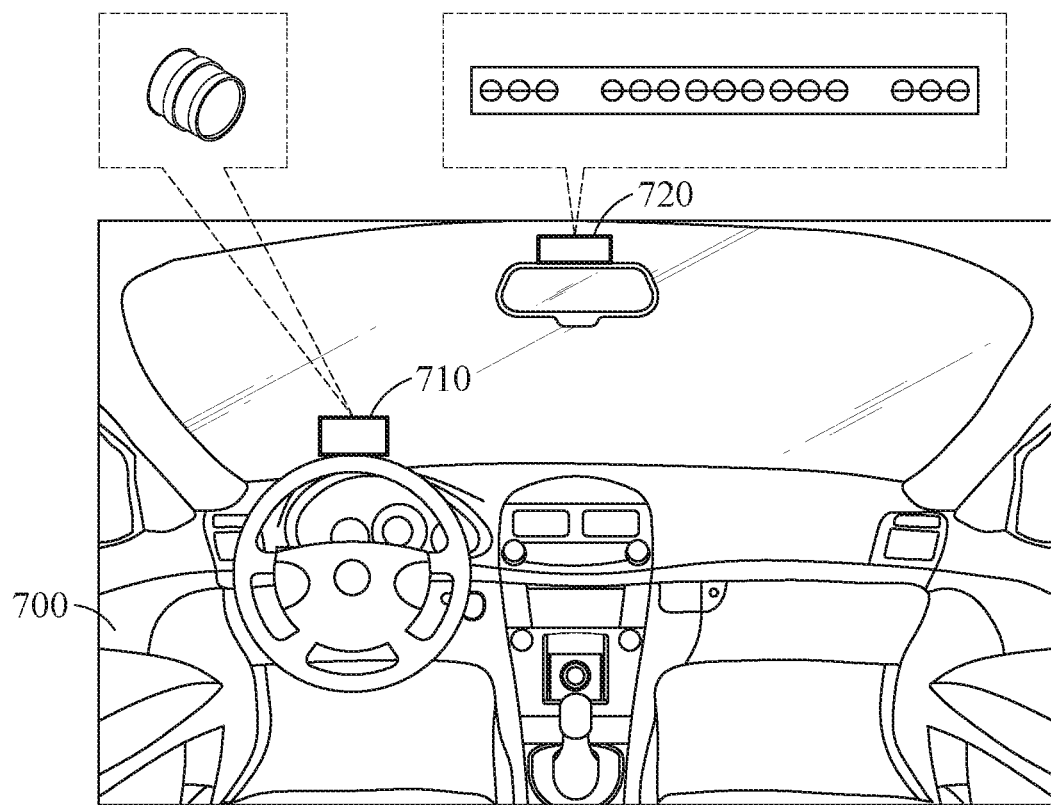
FIG. 7 is a diagram illustrating an example in which a reflection detection apparatus is implemented in a vehicle according to an example embodiment.

FIG. 7 is a diagram illustrating an example in which a reflection detection apparatus is implemented in a vehicle according to an example embodiment.

For example, the reflection detection apparatus may be included in a vehicle 700. The reflection detection apparatus may include an image acquirer 710 and an infrared light source 720. The image acquirer 710 may be located in a dashboard that is in front of a driver. The infrared light source 720 may be located on a rearview mirror of the vehicle 700.

During driving of the vehicle 700, the reflection detection apparatus may acquire an input image from which a reflection is removed, based on an activation and a deactivation of the infrared light source 720. For example, even in a low illumination environment (for example, nighttime), the reflection detection apparatus may accurately detect a gaze of a user based on an input image from which a reflection by an infrared ray is removed.

However, an arrangement of the image acquirer 710 and the infrared light source 720 is not limited to the above description. For example, the image acquirer 710 and the infrared light source 720 may be arranged so that a predetermined angle may be formed by a direction of the image acquirer 710 and a direction of the infrared light source 720.

Figure 8:
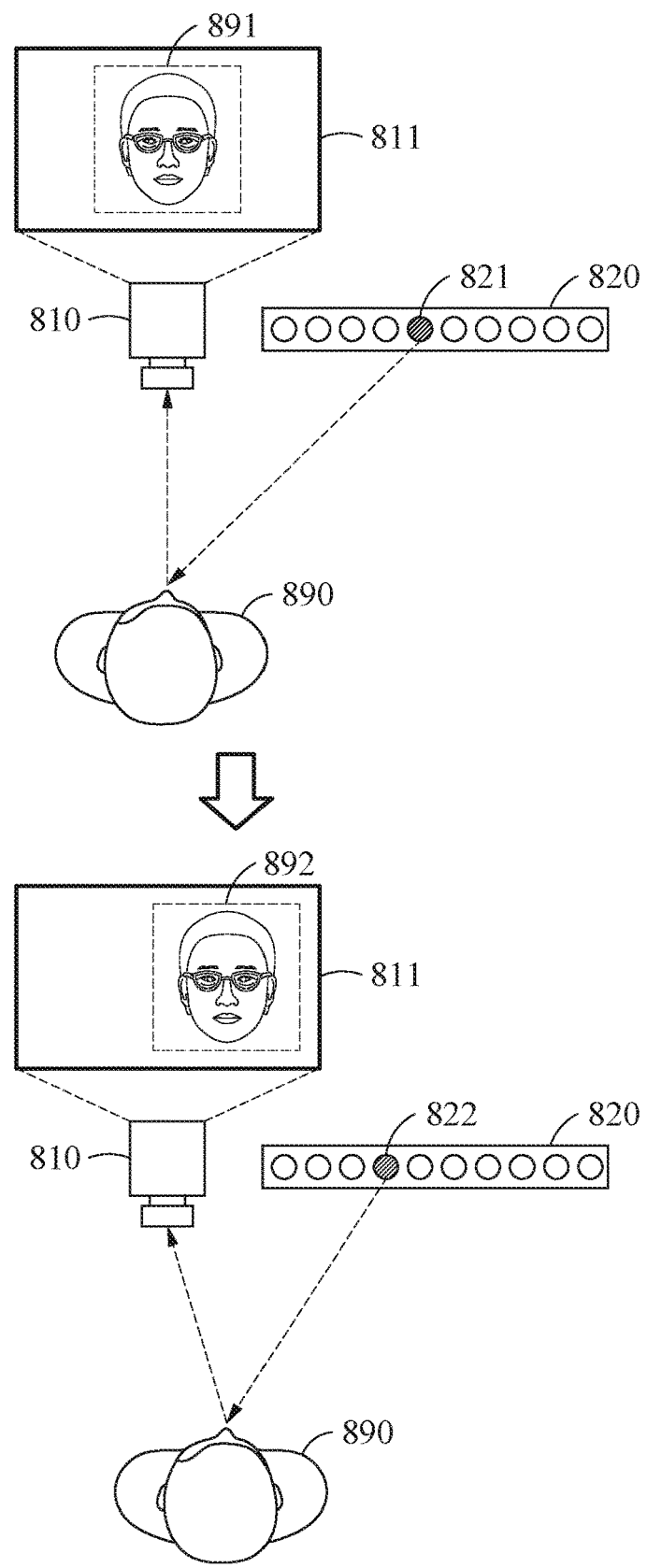
FIG. 8 is a diagram illustrating a spatial adjustment of an infrared light source based on a movement of an object according to an example embodiment.

FIG. 8 is a diagram illustrating a spatial adjustment of an infrared light source based on a movement of an object according to an example embodiment.

Referring to FIG. 8, a reflection detection apparatus may include an image acquirer 810 and an infrared ray array 820. The infrared ray array 820 may include a plurality of infrared light sources. The plurality of infrared light sources may be horizontally arranged. However, the example embodiment is not limited thereto, and the plurality of infrared light sources may be arranged vertically or in a two-dimensional (2D) structure of "n" rows and "m" columns in which n and m may be integers greater than or equal to "1." However, a structure of the infrared ray array 820 is not limited thereto, and the plurality of infrared light sources may be variously arranged.

At least a portion of the infrared light sources in the infrared ray array 820 may emit infrared rays. For convenience of description, in FIG. 8, a first infrared light source 821 among the plurality of infrared light sources may emit an infrared ray, however, there is no limitation thereto. At least two infrared light sources may emit infrared rays. The image acquirer 810 may receive an infrared ray that is emitted from the first infrared light source 821 and that is reflected from an object 890. The image acquirer 810 may generate an input image 811 including an object region 891 representing the object 890 based on the received infrared ray together with a visible ray. In this example, a predetermined angle may be formed by a direction of the first infrared light source 821 and a direction of the image acquirer 810.

Also, the reflection detection apparatus may track a position of the object 890. The reflection detection apparatus may detect a change in the position of the object 890, based on the image acquirer 810. For example, a movement to an object region 892 representing the object 890 may be sensed in the input image 811 acquired by the image acquirer 810.

The reflection detection apparatus may designate an infrared light source corresponding to the tracked position from the infrared ray array 820 that includes the plurality of infrared light sources. For example, the reflection detection apparatus may designate a second infrared light source 822 that is mapped to the object region 892 in the input image 811, from the infrared ray array 820. In this example, the above-described angle may be formed by a direction of the second infrared light source 822 and the direction of the image acquirer 810.

For example, the reflection detection apparatus may assign the infrared light sources of the infrared ray array 820 for each region of the input image 811. Because the infrared light sources are horizontally arranged as shown in FIG. 8, the reflection detection apparatus may assign the infrared light sources for each of regions into which the input image 811 is horizontally divided. Because the object 890 horizontally moves to the right, the reflection detection apparatus may designate the second infrared light source 822 located further leftward in comparison to the first infrared light source 821. In response to a movement of the object 890 being detected, the reflection detection apparatus may select an infrared light source that is activated during an on interval from the infrared ray array 820 so that a predetermined angle formed by the direction of the image acquirer 810 and a direction of an infrared ray may be maintained at the position of the object 890.

The reflection detection apparatus may activate the designated infrared light source during an on interval, and may deactivate the designated infrared light source during an off interval. The reflection detection apparatus may periodically repeat an activation and deactivation of the second infrared light source 822 until the position of the object 890 is changed again.

For example, the reflection detection apparatus may quickly designate an infrared light source corresponding to the position of the object 890 immediately when the movement of the object 890 is detected. Thus, the reflection detection apparatus may select an appropriate infrared light source instead of individually turn on or off the infrared light sources of the infrared ray array 820. For example, when a face position is changed due to a change in a user's posture during driving of a vehicle including the reflection detection apparatus, the reflection detection apparatus may quickly remove a reflection by selecting an appropriate infrared light source.

Figure 9:
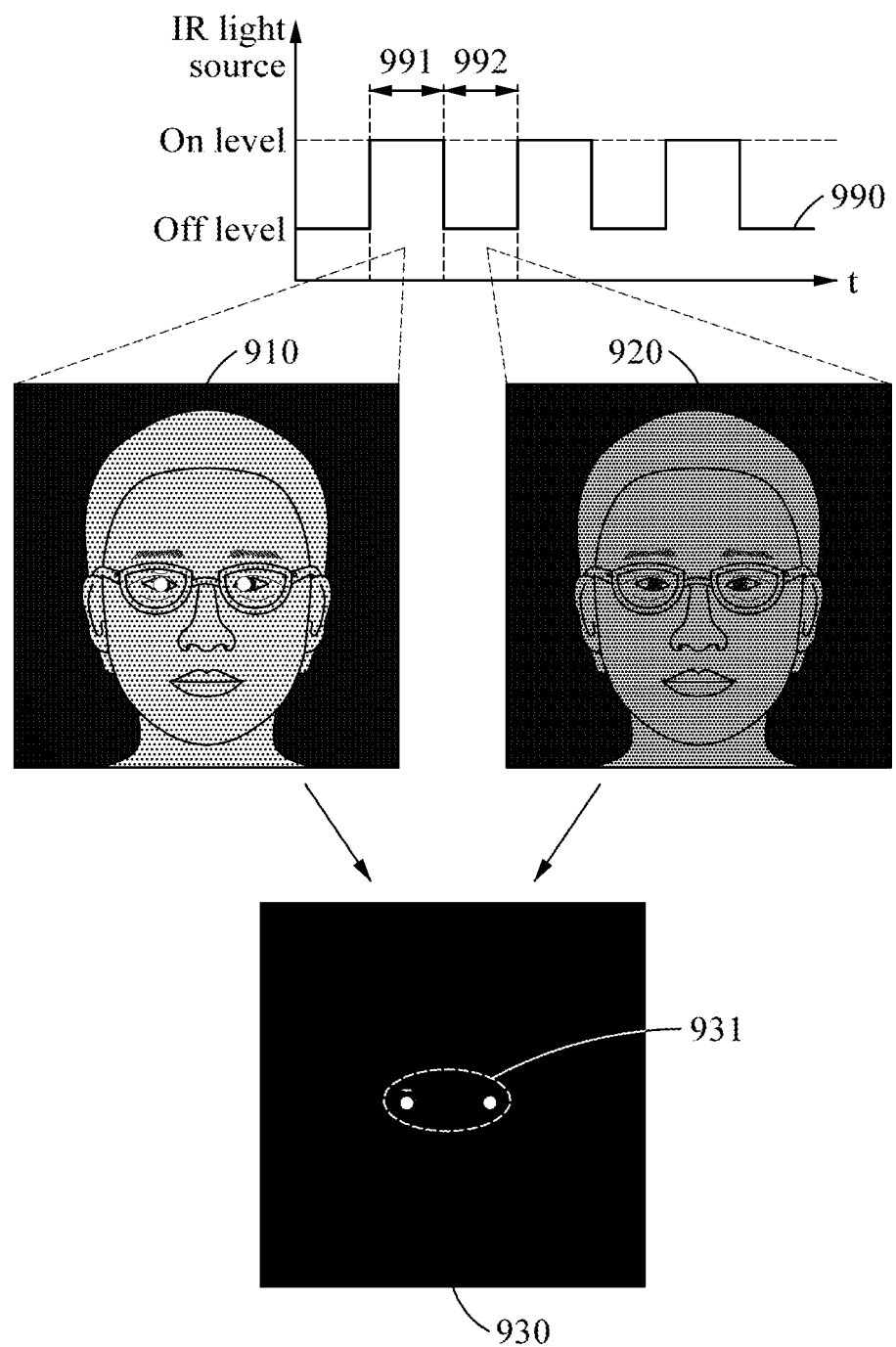
FIGS. 9, 10 and 11 are diagrams illustrating a temporal adjustment of an infrared light source according to example embodiments.
Figure 10:
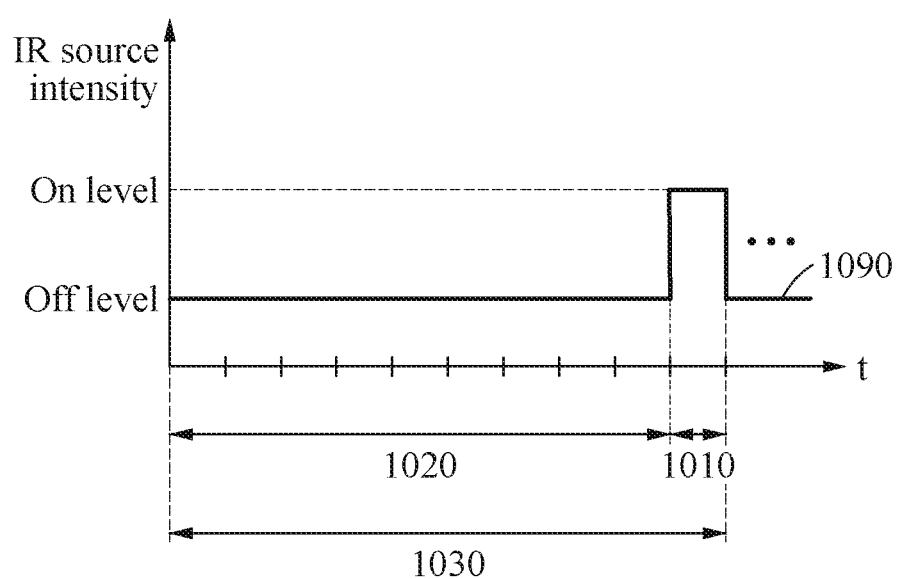
Figure 11:
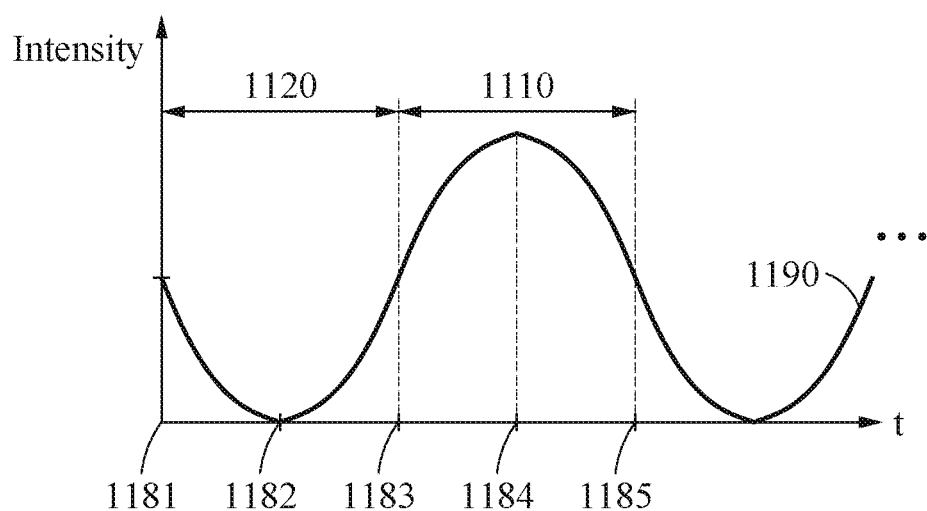

FIGS. 9, 10 and 11 are diagrams illustrating a temporal adjustment of an infrared light source according to example embodiments.

FIG. 9 illustrates a periodic repetition of an activation and a deactivation of an infrared light source.

A reflection detection apparatus may periodically repeat an activation and a deactivation of the infrared light source, to acquire an input image 910 and a reference image 920. For example, the reflection detection apparatus may activate the infrared light source during an on interval 991, and may deactivate the infrared light source during an off interval 992.

For example, the reflection detection apparatus may increase a ray intensity 990 of the infrared light source from an off level to an on level during the on interval 991. Also, the reflection detection apparatus may decrease the ray intensity 990 from the on level to the off level during the off interval 992.

The reflection detection apparatus may generate the input image 910 based on a visible ray and an infrared ray received during the on interval 991. Also, the reflection detection apparatus may generate the reference image 920 based on a visible ray received during the off interval 992. The reflection detection apparatus may calculate a difference map 930 by subtracting the reference image 920 from the input image 910. The reflection detection apparatus may determine elements of the difference map 930 that have values exceeding a threshold to be a reflection region 931.

FIG. 10 illustrates an example of an activation and a deactivation of an infrared light source.

Referring to FIG. 10, a length of an on interval 1010 may be less than a length of an off interval 1020. For example, when a frame rate of an image acquirer is "30" frames per second (fps), a predetermine period 1030 may correspond to ten frames. The off interval 1020 may correspond to nine frames, and the on interval 1010 may correspond to one frame. A reflection detection apparatus may reduce the length of the on interval 1010, to reduce a cumulative amount of an infrared ray intensity 1090. The reflection detection apparatus may adjust the on interval 1010, to minimize an influence of infrared rays on a human body.

Also, the reflection detection apparatus may dynamically adjust the length of the on interval 1010 in which the infrared light source is activated, and the length of the off interval 1020 in which the infrared light source is deactivated. In an example, in an environment (for example, a dark environment) in which an accuracy of a gaze detection decreases, the reflection detection apparatus may increase the length of the on interval 1010. In another example, in an environment (for example, a bright environment) with a relatively high accuracy of the gaze detection, the reflection detection apparatus may reduce the length of the on interval 1010. Thus, the reflection detection apparatus may enhance an accuracy of a pupil detection while minimizing an influence of infrared rays on a human body.

FIG. 11 illustrates a gradual activation and deactivation of an infrared light source.

A reflection detection apparatus may gradually increase a ray intensity 1190 of the infrared light source from a start timing 1183 to an intermediate timing 1184 in an on interval 1110. The reflection detection apparatus may gradually decrease the ray intensity 1190 from the intermediate timing 1184 to an end timing 1185 in the on interval 1110. The reflection detection apparatus may gradually decrease the ray intensity 1190 from a start timing 1181 to an intermediate timing 1182 in an off interval 1120. The reflection detection apparatus may gradually increase the ray intensity 1190 from the intermediate timing 1182 to an end timing 1183 in the off interval 1120. The end timing 1183 in the off interval 1120 may be identical to the start timing 1183 of the on interval 1110. For example, the reflection detection apparatus may adjust the ray intensity 1190 in a form of a sinusoidal wave, for example, a sine wave or a cosine wave. However, the example embodiment is not limited thereto, and the reflection detection apparatus may consecutively change the ray intensity 1190.

The reflection detection apparatus may generate an input image by accumulating intensities of rays that are reflected from an object and received during the on interval 1110. Also, the reflection detection apparatus may generate a reference image by accumulating intensities of rays that are reflected from an object and received during the off interval 1120.

Figure 12:
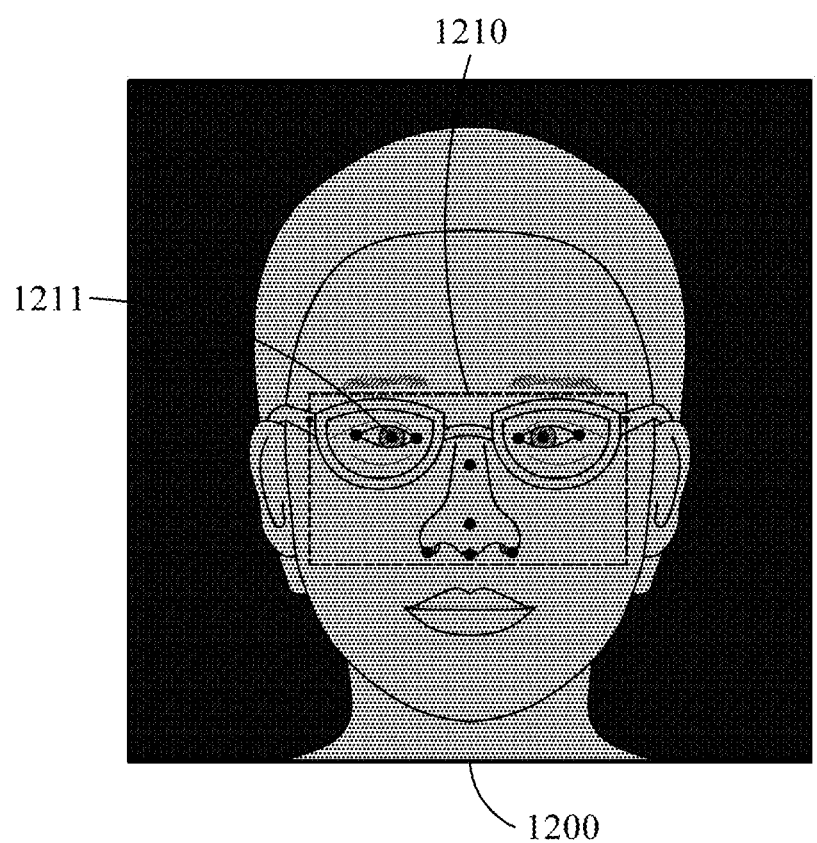
FIG. 12 is an image from which a reflection region is removed according to an example embodiment.

FIG. 12 is an image from which a reflection region is removed according to an example embodiment.

A reflection detection apparatus may remove a reflection region acquired using the method of FIGS. 1 through 11 from an input image 1200. For example, the reflection detection apparatus may perform a hole-filling algorithm (for example, inpainting) on a reflection region of the input image 1200. The reflection detection apparatus may remove the reflection region from the input image 1200, and may fill a hole region generated by removing the reflection region to be similar to a neighboring region. In an example, the reflection detection apparatus may fill values of pixels in the hole region with values of pixels in the neighboring region, using the hole-filling algorithm. In another example, the reflection detection apparatus may fill values of pixels in the hole region with values similar to values of pixels in the neighboring region, using the hole-filling algorithm. Thus, the reflection detection apparatus may process the input image 1200 so that the hole region and the neighboring region may become blurred.

The reflection detection apparatus may extract a feature point form the input image 1200 from which the reflection region is removed, and may determine an upper face region 1210 based on the feature point. The reflection detection apparatus may determine an eye region from the upper face region 1210 and may track a pupil 1211 of a user.

Figure 13:
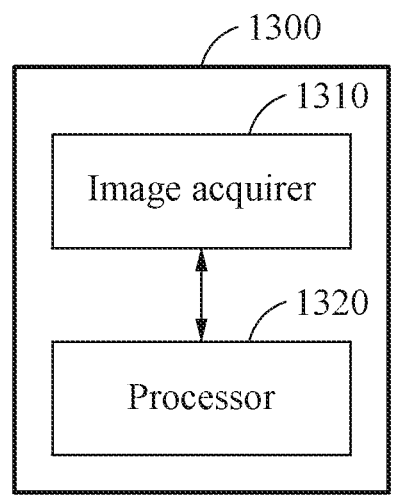
FIGS. 13 and 14 are block diagrams illustrating examples of a configuration of a reflection detection apparatus according to example embodiments.
Figure 14:
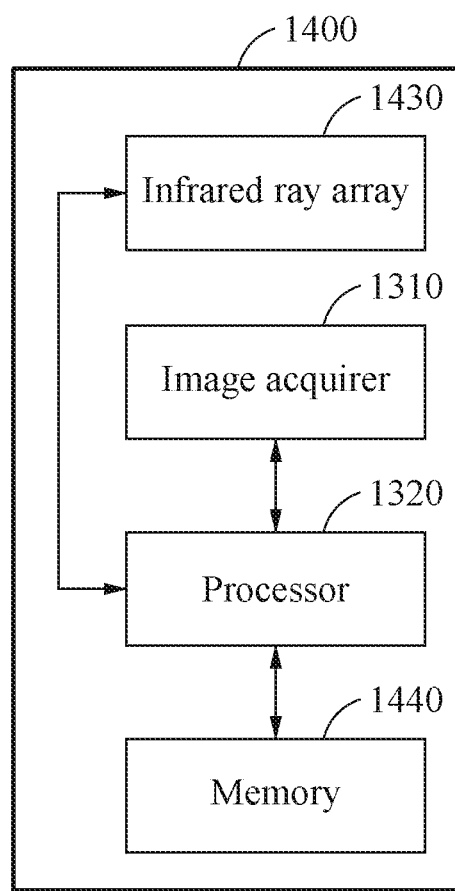

FIGS. 13 and 14 are block diagrams illustrating examples of a configuration of a reflection detection apparatus according to example embodiments.

Referring to FIG. 13, a reflection detection apparatus 1300 includes an image acquirer 1310 and a processor 1320.

The image acquirer 1310 may acquire an input image based on an activation of an infrared light source, and may acquire a reference image based on a deactivation of the infrared light source. The image acquirer 1310 may receive rays that correspond to a visible ray region and an infrared region. The image acquirer 1310 may include a camera configured to capture the visible ray region and the infrared region. For example, the image acquirer 1310 may include a high-speed camera with a frame rate that is greater than or equal to "120" fps. The input image that is mainly based on the infrared region and the reference image that is mainly based on the visible ray region may represent similar object shapes. A region with a great different in pixel values between the input image and the reference image may be a reflection region.

The processor 1320 may extract a reflection region from the input image based on the input image and the reference image. The input image may be acquired based on an infrared region corresponding to a ray received from an object during an on interval, and the reference image may be acquired based on a visible ray region corresponding to a ray received from an object during an off interval.

Referring to FIG. 14, a reflection detection apparatus 1400 may further include an infrared ray array 1430 and a memory 1440. The processor 1320 may activate at least a portion of infrared light sources included in the infrared ray array 1430 during an on interval, and may deactivate at least a portion of the infrared light sources in the infrared ray array 1430 during an off interval. Also, the processor 1320 may generate a difference map indicating a difference between the input image and the reference image by subtracting a pixel value of the reference image corresponding to a pixel value of the input image from the pixel value of the input image, and may extract the reflection region based on the difference map.

The infrared ray array 1430 may include a plurality of infrared light sources and may be spaced from the image acquirer 1310. For example, the infrared ray array 1430 may be spaced from the image acquirer 1310 so that a predetermined angle may be formed by a direction of the image acquirer 1310 and a direction of an infrared ray emitted from the infrared ray array 1430.

The memory 1440 may store information used to perform a method of detecting a reflection. For example, the memory 1440 may temporarily or permanently store the input image, the reference image and the difference map.

The reflection detection apparatus 1400 may generate an input image from which a pupil may be detected in a low illumination environment (for example, an environment of an illumination less than or equal to 10 Lux). For example, the reflection detection apparatus 1400 may be applicable to a head-up display (HUD) configured to provide an autostereoscopic three-dimensional (3D) image by tracking a gaze. Also, the reflection detection apparatus 1400 may be applicable to a personal computer (PC) connected to a monitor. In addition, the reflection detection apparatus 1400 may be applicable to a tablet device or a smartphone configured to provide an autostereoscopic 3D image.

For example, during infrared imaging in a low illumination environment (for example, driving at night-time), the reflection detection apparatus 1400 may detect and remove an infrared reflection on lenses of glasses. Thus, the reflection detection apparatus 1400 may enhance an accuracy of a gaze tracking in a relatively dark environment (for example, an environment of an illumination less than or equal to 10 Lux).

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations that may be performed by a computer. The media may also include, alone or in combination with the program instructions, data files, data structures, and the like. The program instructions recorded on the media may be those designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a reflection, the method being performed by an apparatus for detecting the reflection, and the method comprising:
   acquiring an input image of an object, based on an activation of an infrared light source;
   acquiring a reference image of the object, based on a deactivation of the infrared light source; and
   extracting a reflection region from the input image, based on the input image and the reference image.

2. The method of claim 1, wherein the acquiring of the input image comprises activating the infrared light source during an on interval, and
   the acquiring of the reference image comprises deactivating the infrared light source during an off interval.

3. The method of claim 2, wherein the acquiring of the input image further comprises generating the input image, based on a first plurality of rays received from the object, during the on interval, and
   the acquiring of the reference image further comprises generating the reference image, based on a second plurality of rays received from the object, during the off interval.

4. A method of detecting a reflection, the method being performed by an apparatus for detecting the reflection, and the method comprising:
   acquiring an input image of an object, based on an activation of an infrared light source;
   acquiring a reference image of the object, based on a deactivation of the infrared light source; and
   extracting a reflection region from the input image, based on the input image and the reference image,
   wherein the acquiring of the input image comprises activating the infrared light source during an on interval,
   wherein the acquiring of the reference image comprises deactivating the infrared light source during an off interval,
   wherein the acquiring of the input image further comprises generating the input image, based on a first plurality of rays received from the object, during the on interval, and
   wherein the acquiring of the reference image further comprises generating the reference image, based on a second plurality of rays received from the object, during the off interval,
   wherein the generating of the input image comprises:
      collecting first intensities of the first plurality of rays that is received from the object, during a first portion of first frames in the on interval; and
      determining the first intensities as first pixel values of first pixels of the input image, to generate the input image, and
   wherein the generating of the reference image comprises:
      collecting second intensities of the second plurality of rays that is received from the object, during a second portion of second frames in the off interval; and
      determining second intensities as second pixel values of second pixels of the reference image, to generate the reference image.

5. The method of claim 1, wherein the extracting of the reflection region comprises:
   generating a difference map by subtracting first pixel values of the reference image from second pixel values of the input image respectively corresponding to the first pixel values, the difference map indicating a difference between the input image and the reference image; and
   extracting the reflection region from the input image, based on the difference map.

6. The method of claim 5, wherein the extracting of the reflection region further comprises:
   determining elements of the difference map, the elements having difference values exceeding a threshold; and
   determining, as the reflection region, pixels of the input image that correspond to the elements.

7. The method of claim 1, further comprising:
   tracking a position of the object; and
   designating at least one of a plurality of infrared light sources included in an infrared ray array, the at least one of the plurality of infrared light sources corresponding to the position that is tracked, wherein the acquiring of the input image comprises activating the at least one of the plurality of infrared light sources that is designated, during an on interval, and wherein the acquiring of the reference image comprises deactivating the at least one of the plurality of infrared light sources that is designated, during an off interval.

8. A method of detecting a reflection, the method being performed by an apparatus for detecting the reflection, and the method comprising:

acquiring an input image of an object, based on an activation of an infrared light source;

acquiring a reference image of the object, based on a deactivation of the infrared light source; and extracting a reflection region from the input image, based on the input image and the reference image, wherein the acquiring of the input image comprises acquiring the input image, based on an infrared region of a first ray that is received from the object during an on interval in which the infrared light source is activated, and wherein the acquiring of the reference image comprises acquiring the reference image, based on a visible ray region of a second ray that is received from the object during an off interval in which the infrared light source is deactivated.

9. The method of claim 1, further comprising dynamically adjusting a first length of an on interval in which the infrared light source is activated and a second length of an off interval in which the infrared light source is deactivated.

10. The method of claim 1, further comprising:

removing the reflection region from the input image; and tracking a gaze of a user, based on the input image from which the reflection region is removed.

11. The method of claim 1, wherein the infrared light source and an image acquirer are arranged so that a predetermined angle is formed by a first direction in which the infrared light source emits a first ray to the object and by a second direction in which the image acquirer receives a second ray from the object.

12. The method of claim 1, further comprising:

gradually increasing a ray intensity of the infrared light source from a first start timing to a first intermediate timing in an on interval in which the infrared light source is activated;

gradually decreasing the ray intensity from the first intermediate timing to a first end timing in the on interval;

gradually decreasing the ray intensity from a second start timing to a second intermediate timing in an off interval in which the infrared light source is deactivated; and gradually increasing the ray intensity from the second intermediate timing to a second end timing in the off interval.

13. The method of claim 1, further comprising periodically deactivating the infrared light source, in response to a detection of a transparent object that causes a light reflection between a user and the apparatus.

14. The method of claim 1, wherein the acquiring of the input image comprises increasing an intensity of the infrared light source from an off level to an on level, during an on interval; and the acquiring of the reference image comprises decreasing the intensity of the infrared light source from the on level to the off level, during an off interval.

15. A non-transitory computer-readable storage medium storing instructions that, when executed by a processor, cause the processor to perform the method of claim 1.

16. An apparatus for detecting a reflection, the apparatus comprising:

an image acquirer configured to:

acquire an input image of an object, based on an activation of an infrared light source; and acquire a reference image of the object, based on a deactivation of the infrared light source; and a processor configured to extract a reflection region from the input image, based on the input image and the reference image.

17. An apparatus for detecting a reflection, the apparatus comprising:

an image acquirer configured to:

acquire an input image of an object, based on an activation of an infrared light source; and acquire a reference image of the object, based on a deactivation of the infrared light source; and a processor configured to extract a reflection region from the input image, based on the input image and the reference image, wherein the processor is further configured to:

generate a difference map by subtracting first pixel values of the reference image from second pixel values of the input image respectively corresponding to the first pixel values, the difference map indicating a difference between the input image and the reference image; and extract the reflection region from the input image, based on the difference map.

18. The apparatus of claim 16, further comprising an infrared ray array spaced apart from the image acquirer so that a predetermined angle is formed by a first direction in which the infrared ray array emits a first ray to the object and a second direction in which the image acquirer receives a second ray from the object, wherein the processor is further configured to activate at least one of a plurality of infrared light sources included in the infrared ray array, so that the predetermined angle is maintained at a position of the object, in response to a movement of the object being detected.

19. A method of detecting a reflection, the method being performed by an apparatus for detecting the reflection, and the method comprising:

acquiring an input image of an object, based on an activation of an infrared light source;

acquiring a reference image of the object, based on a deactivation of the infrared light source;

generating a difference map by subtracting first pixel values of the reference image from second pixel values of the input image respectively corresponding to the first pixel values;

determining elements of the difference map, the elements having difference values exceeding a threshold; and removing a reflection region from the input image, the reflection region corresponding to the elements.

20. The method of claim 19, further comprising adjusting a first length of an on interval in which the infrared light source is activated to be shorter than a second length of an off interval in which the infrared light source is deactivated.

* * * * *